(No Model.)
C. W. WEISS.
PHOTOGRAPHIC PASSENGER RECORDER.
No. 283,174. Patented Aug. 14, 1883.
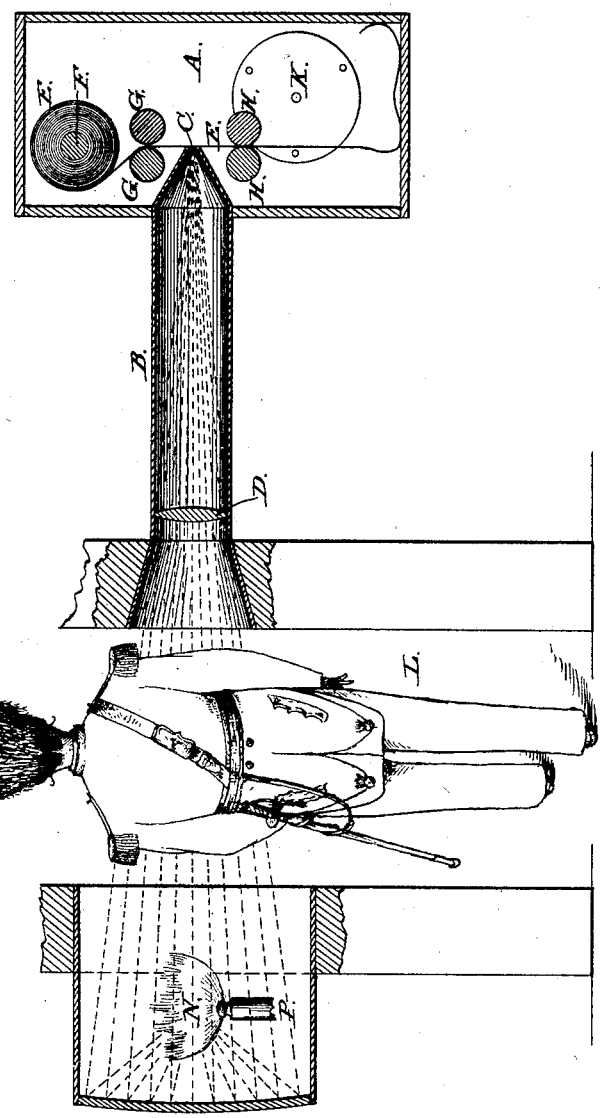

UNITED STATES PATENT OFFICE.

CHARLES W. WEISS, OF BROOKLYN, ASSIGNOR OF ONE-HALF TO CHARLES KRUSE, OF NEW YORK, N. Y.

PHOTOGRAPHIC PASSENGER-RECORDER.

SPECIFICATION forming part of Letters Patent No. 283,174, dated August 14, 1883.

Application filed August 30, 1882. (No model.)

*To all whom it may concern:*

Be it known that I, CHARLES W. WEISS, of Brooklyn, in the county of Kings and State of New York, have invented a new and useful Improvement in Apparatus for Photographic Passenger-Recorders, &c.; and I do hereby declare that the following is a full and exact description thereof, reference being had to the accompanying drawing, and to the letters of reference marked thereon, making a part of this specification.

My invention relates to an apparatus for indicating and recording the number of persons or objects which may singly pass a given point; and it consists in casting, by suitable means, a beam of light obtained from any suitable source across a passage-way through which the objects to be counted must pass, and in concentrating the rays in a focus upon a moving strip of sensitized paper, so that the pencil of light shall produce a constant well-defined photographic impression upon the paper, except when interrupted by the obscuration or interception of the light-rays by the passing body. The interruptions thus defined upon the sheet will serve to indicate accurately the number of objects which, in passing, have caused these interruptions.

In the accompanying drawing, A is a suitable camera or darkened chamber; B, a cylindrical tube let into the side of the chamber, and whose inner end is tapered conically to a very small aperture, C. The outer end of this tube is extended sufficiently to cut off the admission of all side lights thereto, and is fitted near its outer opening with a lens, D, adapted to concentrate all rays of light entering the tube to a focus at the inner aperture, C.

Within the camera A is placed a long strip, E, of photographic paper rendered sensitive to the light by any of the well-known processes now in use for the purpose. This strip E of sensitized paper is rolled up compactly upon a roller, F, which is properly journaled in suitable bearings, so that the strip may be readily unwound therefrom, and the end of the strip E is carried from its roll between two guide-rollers, G G, over the aperture C, and thence between friction-rollers H H, which are actuated by clock-work K, or other suitable mechanism, and serve to draw the paper at a uniform constant rate across said aperture C. The strip of paper, after being thus drawn across the aperture C, may drop into the lower portion of the camera, or be automatically rolled up upon a suitable take-up roller to be driven by the motive mechanism K.

The camera and tube fitted with sensitized paper drawn automatically over the aperture at the inner end of the tube is placed in the side of a passage-way, L, so arranged that but one person or object may pass through it at a time, and the outer end of the tube B is so located that each person or object passing through the passage-way must, in so doing, pass directly in front of the tube. Upon the opposite side of the passage-way L, and immediately in front of the open end of the tube L, is placed a mirror or lens, M, constructed and arranged to throw and concentrate the rays of a light, N, in a bright beam, across the passage-way directly into the tube B and upon the lens D therein. The beam of light thus directed across the passage-way may be derived from a gas-burner, P, an electric light, or from other artificial source, or may, in suitable localities and under certain conditions, be derived from the sun. This beam of light, reflected from the mirror or lens M across the passage-way L upon the lens D, is concentrated in a small point upon the sensitized paper E, so as to produce thereon photographically a sharp well-defined impression, which will become apparent upon removing and treating the paper chemically to develop the image, according to the processes well known to the art for such development. As the paper is in constant motion, the impression produced by the light will appear in a continuous unbroken line so long as the beam of light thrown into the tube of the camera is continuous and unobstructed; but whenever the beam shall be intercepted and obstructed, even momentarily, the constant line upon the paper will be broken and a white space will occur therein. Hence each time a person or an object passes through the passage-way across the transverse beam of light therein the momentary interception of the light thus produced will be indicated upon the strip of paper, which will thus be made to register accurately the number of persons or objects passing through the passage-way L. The paper may be so ruled and the clock-work so adjusted in its movements as that the slip of paper shall indicate the exact time at which each separate record was made thereon.

I contemplate as a modification of my invention, for which I shall make a separate application for Letters Patent, suspending or pivoting the reflecting-mirror M in such manner that the weight of a person or of an object passing through the passage-way L shall serve to slightly turn the mirror upon its axis, and thus deflect the beam of light reflected thereupon. As each deflection is recorded photographically upon the strip of paper the number thereof will indicate the number of persons or objects producing the same. In such case the beam of light need not be thrown across the passage-way, but the camera may be placed upon the same side of the passage-way as the light and lens.

I claim as my invention—

1. The method, substantially as herein described, of registering the number of persons or objects passing a given point by interceptions of a beam of light focalized and photographed upon a constantly-moving strip of sensitized paper within a suitable camera, said interceptions being produced by the passage of each person or object across the beam of light in its course to the camera.

2. The combination, in an apparatus for registering passing objects or persons, of a reflecting-mirror, M, a camera, A, containing a strip of sensitized paper, E, a motor producing a constant progressive movement of the strip of paper, a tube, B, and a lens, D, for focalizing the light reflected from the mirror in a single point upon the paper, and a passage-way interposed between the camera, A, and mirror M, so that persons or objects passing through said way shall unavoidably intercept the beam of light cast from the mirror into the camera, all substantially in the manner and for the purpose herein set forth.

In testimony whereof I have signed my name to this specification in the presence of two subscribing witnesses.

CHAS. W. WEISS.

Witnesses:
J. F. ACKER, Jr.,
CHAS. KRUSE.